US012654633B2

(12) United States Patent
Jacqus et al.

(10) Patent No.: US 12,654,633 B2
(45) Date of Patent: Jun. 16, 2026

(54) DEVICE FOR THE ACOUSTIC INSULATION OF A MOTOR VEHICLE GLAZING

(71) Applicant: SAINT-GOBAIN GLASS FRANCE, Courbevoie (FR)

(72) Inventors: Gary Jacqus, Paris (FR); Volodymyr Iurasov, Vincennes (FR); Sylvain Berger, Paris (FR); Gerald Mercier, Compiegne (FR); Jean-Philippe Boure, Ribecourt-Dreslincourt (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 223 days.

(21) Appl. No.: 18/557,702

(22) PCT Filed: Apr. 29, 2022

(86) PCT No.: PCT/FR2022/050836
§ 371 (c)(1),
(2) Date: Oct. 27, 2023

(87) PCT Pub. No.: WO2022/229582
PCT Pub. Date: Nov. 3, 2022

(65) Prior Publication Data
US 2024/0217456 A1 Jul. 4, 2024

(30) Foreign Application Priority Data
Apr. 29, 2021 (FR) ...................................... 2104522

(51) Int. Cl.
*B60R 13/08* (2006.01)
*G10K 11/162* (2006.01)
(52) U.S. Cl.
CPC ........ *B60R 13/0815* (2013.01); *G10K 11/162* (2013.01)

(58) Field of Classification Search
CPC .......................... B60R 13/0815; G10K 11/162
See application file for complete search history.

(56) References Cited

U.S. PATENT DOCUMENTS 4,011,356 A * 3/1977 Lambert ........... B32B 17/10055
428/34
4,614,676 A * 9/1986 Rehfeld ................ E06B 3/6707
428/441

(Continued)

FOREIGN PATENT DOCUMENTS

DE      102016116554 B3    12/2017
EP         0 844 075 B1     9/2002

OTHER PUBLICATIONS

International Search Report as issued in International Patent Application No. PCT/FR2022/050836, dated Aug. 3, 2022.

(Continued)

*Primary Examiner* — Forrest M Phillips
(74) *Attorney, Agent, or Firm* — CUSHMAN PARTNERS, LLC

(57) ABSTRACT

A device for soundproofing a plate, includes a soundproofing part and a mounting part, wherein the mounting part is to be mounted secured to a border of the plate, the mounting part being mounted secured to the soundproofing part and having a second thickness $h_2$ in contact with the soundproofing part, and the soundproofing part is made of a first material, and extends along a first length l in a first main direction, the soundproofing part having a first thickness $h_1$ of the first material in a direction perpendicular to the first main direction the first thickness $h_1$ varying, based on an x coordinate, along the first length l, proportionally to a value of $x^n$, wherein n is a real number strictly greater than 1, from a minimal thickness $h_{1min}$ until $h_2$, the first length l being so that $h_{1min}$, is less than or equal to one third of $h_2$.

20 Claims, 5 Drawing Sheets

(56)      References Cited

U.S. PATENT DOCUMENTS

| | | | | |
|---|---|---|---|---|
| 4,810,583 | A * | 3/1989 | Brown | B32B 17/10018 |
| | | | | 428/447 |
| 5,965,853 | A * | 10/1999 | Hornsey | B32B 17/10137 |
| | | | | 181/290 |
| 10,202,183 | B2 * | 2/2019 | McCarthy | B29C 33/0038 |
| 11,979,951 | B2 * | 5/2024 | Luten | B64C 1/1492 |
| 2008/0172959 | A1 | 7/2008 | Pellenkoft et al. | |
| 2009/0159362 | A1 | 6/2009 | Boure et al. | |
| 2012/0169083 | A1 * | 7/2012 | Matsumoto | B60J 5/04 |
| | | | | 296/146.7 |
| 2017/0088063 | A1 * | 3/2017 | Zhang | B60R 13/0212 |
| 2018/0354430 | A1 * | 12/2018 | Dominguez | G10K 11/161 |
| 2025/0249844 | A1 * | 8/2025 | Nagano | G10K 11/172 |

OTHER PUBLICATIONS

Mironov, M. A., "Propagation of a flexural wave in a plate whose thickness decreases smoothly to zero in a finite interval," Soviet Physics Acoustics—USSR, 34(3), May-Jun. 1988, pp. 318-319.
Office Action as issued in Chinese Patent Application No. 202280004166.3, dated Dec. 26, 2025.

* cited by examiner

[Fig. 1]
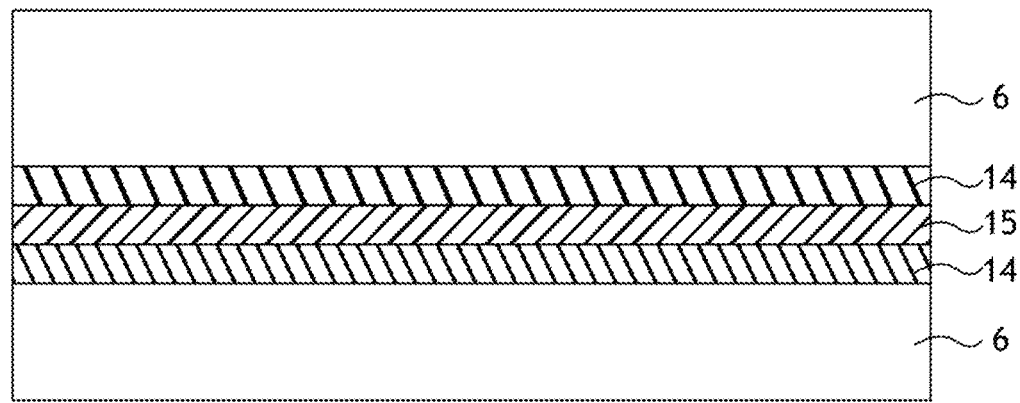
[Fig. 2]
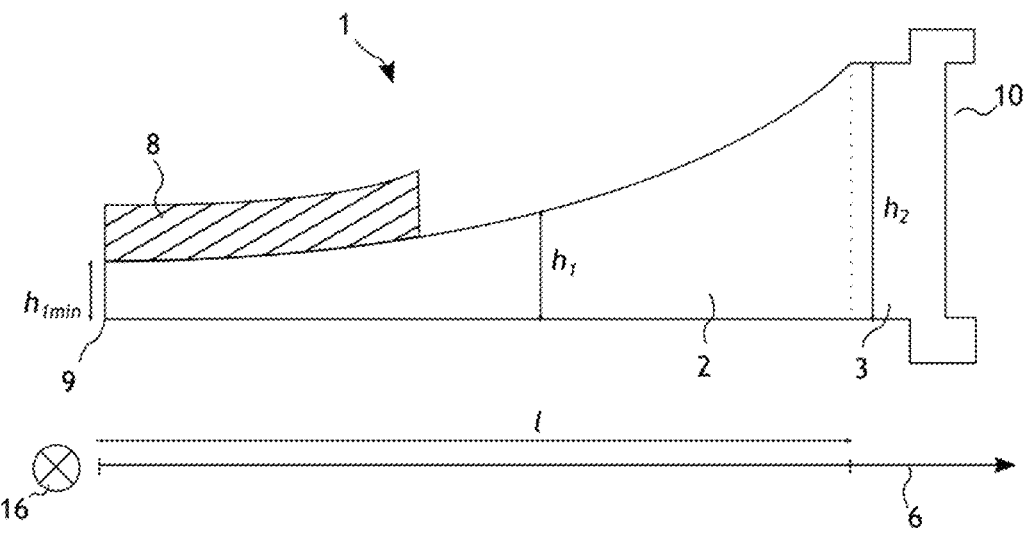

[Fig. 3]
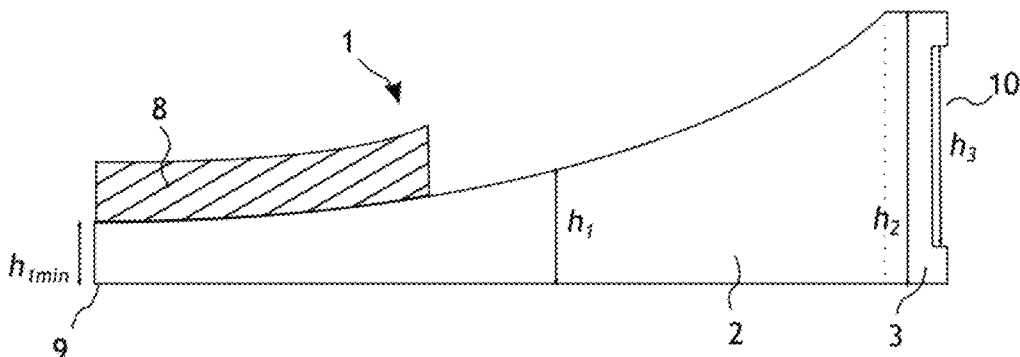
[Fig. 4]
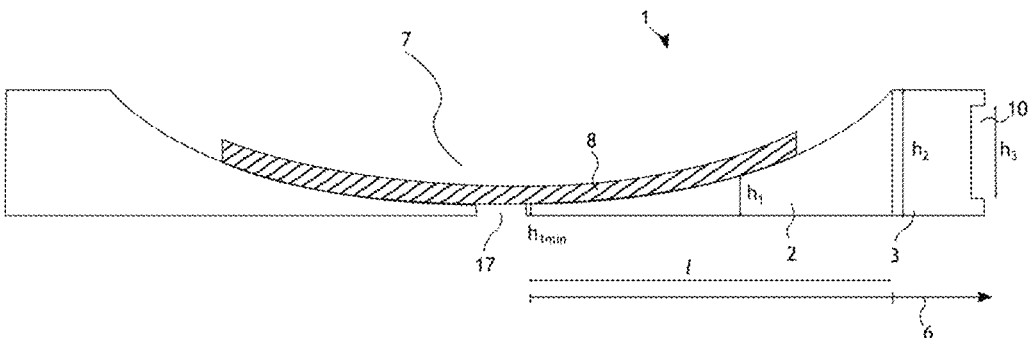
[Fig. 5]
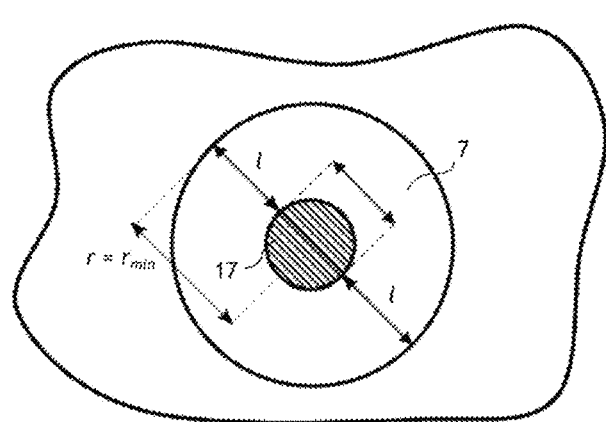

[Fig. 6]
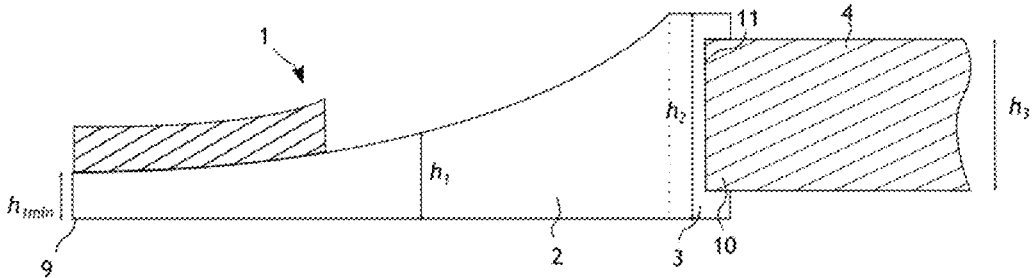
[Fig. 7]
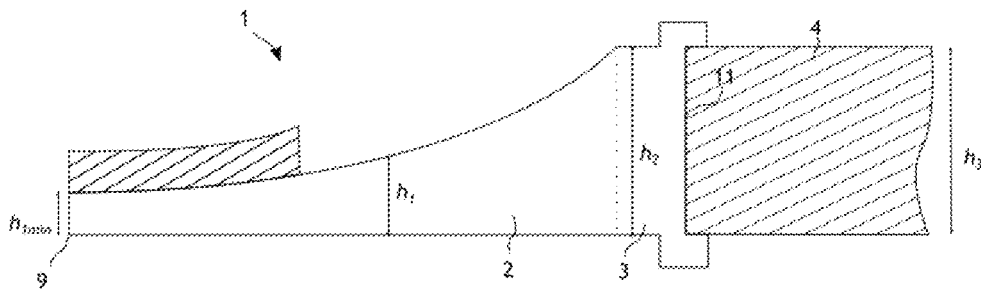
[Fig. 8]
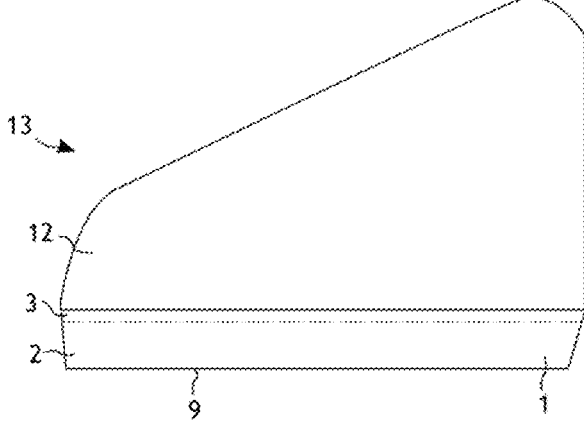

[Fig. 9]
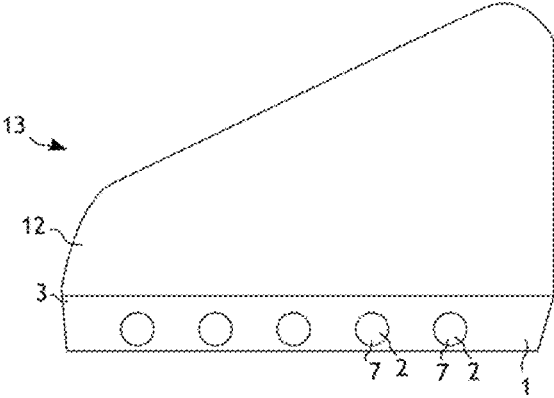
[Fig. 10]
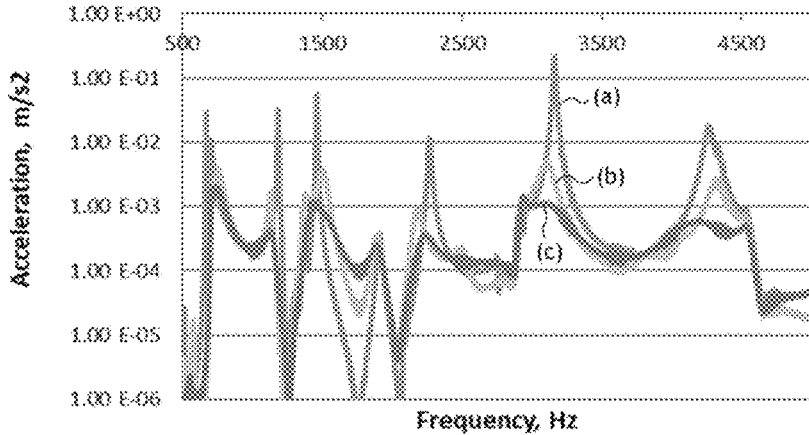

[Fig. 11]
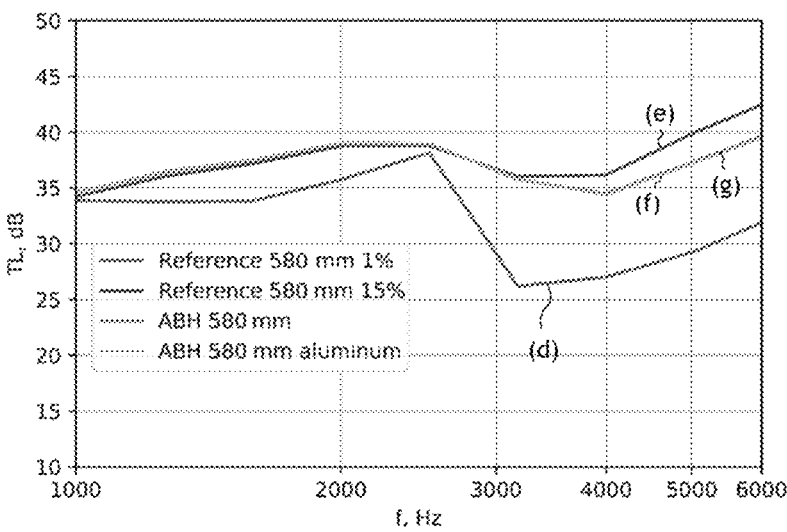

DEVICE FOR THE ACOUSTIC INSULATION OF A MOTOR VEHICLE GLAZING

CROSS-REFERENCE TO RELATED APPLICATIONS

This application is the U.S. National Stage of PCT/FR2022/050836, filed Apr. 29, 2022, which in turn claims priority to French patent application number 2104522 filed Apr. 29, 2021. The content of these applications are incorporated herein by reference in their entireties.

FIELD OF THE INVENTION

The present invention relates to the soundproofing of a glazing for a motor vehicle, and more particularly the soundproofing of a side glazing.

STATE OF THE ART

A vehicle glazing is exposed to air noise during the use of the vehicle. The transmission of this noise by the glazing degrades the acoustic comfort of a user.

It is known to increase the surface mass of the glazing by increasing the thickness thereof in order to improve the soundproofing of the glazing.

However, such a glazing does not make it possible to effectively increase the soundproofing for frequencies greater than 2,000 hertz. Indeed, the coincidence between the frequency of an incident sound wave and the frequency of the bending waves in the glazing leads to a reduction of the soundproofing for this frequency range. Moreover, motor vehicle design requires lightening the various components of the vehicle, so as to reduce the energy consumption of the vehicle and the release of $CO_2$ emissions during the use of the vehicle.

Referring to FIG. 1, document EP 0844075 B1 describes a laminated glazing comprising two mineral glass sheets 6, the two glass sheets 6 being separated by a first layer of polyvinyl butyral 14 (PVB), an interlayer film 15 made of acoustic acrylic polymer, and a second layer of polyvinyl butyral 14. A skilled person refers to this glazing using the terms "acoustic PVB glazing". Such a glazing makes it possible to increase the soundproofing in a frequency range comprised between 2,000 Hz and 20,000 Hz.

However, such a glazing entails high manufacturing costs. Moreover, its manufacture may be complex with regard to the other known glazings. Thus, such a glazing is not generally selected as side glazing of the vehicle.

DISCLOSURE OF THE INVENTION

One aim of the invention is to propose a solution to enable a glazing to have soundproofing greater than or equal to that of a known glazing, at least in an audible frequency range, while limiting the costs associated with the manufacturing of such a glazing.

This aim is reached in the context of the present invention by virtue of a device for soundproofing a plate, comprising a soundproofing part and a mounting part, the mounting part being configured to be mounted secured to a border of the plate, the mounting part being mounted secured to the soundproofing part and having a second thickness $h_2$ in contact with the soundproofing part, the soundproofing part being made of a first material, and extending along a first length l in a first main direction, the soundproofing part having a first thickness $h_1$ of the first material in a direction perpendicular to the first main direction, the first thickness $h_1$ varying, based on an X coordinate, along the first length l, proportionally to a value of $x^n$, wherein n is a real number strictly greater than 1, from a minimal thickness $h_{1min}$ until the second thickness $h_2$, the first length l being predetermined so that the minimal thickness $h_{1min}$ is less than or equal to one third of the second thickness $h_2$.

The present invention is advantageously completed by the following features, taken individually or in any of their technically possible combinations:

n is a real number greater than or equal to 5/3 and preferentially greater than or equal to 2, n is strictly less than 100, the device comprises a side border, and the soundproofing part forms a thinning of the device from the mounting part until the side border, n being preferentially a real number greater than or equal to 2, the soundproofing part has at least one recess in the first material and n is preferentially a real number greater than or equal to 5/3, the recess has an elliptical and preferentially circular shape, a cut-out is formed at the center of the recess, the device comprises a visco-elastic dissipator, the dissipator being mounted secure in contact with at least one part of the soundproofing part, the dissipator being made of a material having a first loss factor $\eta_1$, strictly greater than 0.05, especially strictly greater than 0.10, and preferentially strictly greater than 0.15, the mounting part forms a housing able to receive a border of the plate.

Another aspect of the invention is an assembly comprising a device according to one embodiment of the invention, and a plate having a border, the mounting part being mounted secured to the border of the plate.

Advantageously, the first material has a real part $E'_1$ of the first Young's modulus, a first density $\rho_1$, and a first Poisson's ratio $v_1$, and the mounting part has a first component $\gamma_1$ of phase velocity of a bending wave defined by $$\gamma_1 = \left( \frac{E_1 h_2{}^2}{12\rho_1\left(1 - v_1{}^2\right)} \right)^{\frac{1}{4}}$$

the plate having a third thickness $h_3$, a real part $E'_2$ of the second Young's modulus, a second density $\rho_2$ and a second Poisson's ratio $v_2$, defining a second component $\gamma_2$ of phase velocity of a bending wave defined by $$\gamma_2 = \left( \frac{E_2 h_3{}^2}{12\rho_2\left(1 - v_2{}^2\right)} \right)^{\frac{1}{4}}$$

the difference between the first component $\gamma_1$ and between the second component $\gamma_2$ being less than 20% of the second component $\gamma_2$, and preferentially being less than 10% of the second component $\gamma_2$.

Advantageously, the plate is a glazing.

Advantageously, the glazing comprises at least one mineral glass sheet.

Advantageously, the glazing is a laminated glazing.

Advantageously, the plate is a glazing comprising a mineral glass sheet, and the first material of the device comprises aluminum, the second thickness $h_2$ being equal to the third thickness $h_3$.

Advantageously, the plate is a glazing comprising a mineral glass sheet, and the first material of the device comprises a polymer material, the second thickness $h_2$ being strictly greater than the third thickness $h_3$.

Another aspect of the invention is a method for manufacturing an assembly comprising a device according to one embodiment of the invention, and a plate having a border, the method comprising a step of securing the mounting part to a border of the plate.

DESCRIPTION OF THE FIGURES

Other characteristics, purposes and advantages of the invention will become clear from the following description, which is purely illustrative and non-limiting, and which must be read in the context of the attached drawings in which:

FIG. 1 schematically illustrates a known glazing having soundproofing properties, FIG. 2 schematically illustrates a cross-section of a device according to one embodiment of the invention, wherein the device has a thinning from a mounting part of the device until a side border of the device, FIG. 3 schematically illustrates a cross-section of a device according to one embodiment of the invention, wherein the device has a thinning from a mounting part of the device until a side border of the device, FIG. 4 schematically illustrates a cross-section of a device according to one embodiment of the invention, the device having a recess, FIG. 5 schematically illustrates a recess of a device according to one embodiment of the invention, viewed from above, FIG. 6 schematically illustrates an assembly according to one embodiment of the invention, comprising a device and a plate, the device being mounted secured to the plate, FIG. 7 schematically illustrates an assembly according to one embodiment of the invention, comprising a device and a plate, the device being mounted secured to the plate, FIG. 8 schematically illustrates a side glazing of a motor vehicle according to one embodiment of the invention, FIG. 9 schematically illustrates a glazed element of a motor vehicle according to one embodiment of the invention, FIG. 10 is a diagram illustrating an average acceleration of known glazings and assemblies according to embodiments of the invention, as a function of the frequency of an incident sound wave, FIG. 11 is a diagram illustrating a soundproofing of a known glazing and of assemblies according to embodiments of the invention.

In all the figures, similar elements are marked with identical references.

Definitions

"Loss factor $\eta$" of a material, when the material has a complex Young's modulus E, means the ratio between the imaginary part E" of the Young's modulus of the material, associated with the elasticity of the material, and the real part E' of the Young's modulus of the material, associated with the viscosity of the material.

The loss factor $\eta$ of a material, also referred to as "tan δ", is defined by international standard ISO 18437-2:2005 (*Mechanical vibration and shock—Characterization of the dynamic mechanical properties of visco-elastic materials—Part 2: Resonance method*, part 3.2).

Preferentially, the loss factor $\eta$ can be defined for a predetermined frequency. "A material has a first loss factor $\eta$ greater than a value" means that the material has a first loss factor $\eta$ greater than the value for each of the frequencies in the audible frequency range, that is in a frequency range extending between 20 Hz and 20,000 Hz, inclusive, and preferentially between 20 Hz and 10,000 Hz, inclusive.

The loss factor $\eta$ can be defined for a predetermined temperature. The temperature range considered in the present invention is comprised between −20° C. and 60° C. In the present invention, "a material has a first loss factor $\eta$ greater than a value" means that the material has a first loss factor $\eta$ greater than the value for each of the temperatures comprised between −20° C. and 60° C.

"The real part E' of the Young's modulus of a material is greater than a value" means that the real part E' of the Young's modulus of the material is greater than the real part E' of the Young's modulus of the material for each of the frequencies in the audible frequency range, that is in a frequency range extending between 20 Hz and 20,000 Hz, inclusive, and preferentially between 20 Hz and 10,000 Hz, inclusive.

The real part E' and the imaginary part E" of the Young's modulus can be defined for a predetermined temperature. The temperature range considered in the present invention is comprised between −20° C. and 60° C. In the present invention, "the real part E' of the Young's modulus of a material is greater than a value" means that the material has a real part E' of the Young's modulus greater than the value for each of the temperatures comprised between −20° C. and 60° C. In the present invention, "a material has a first loss factor $\eta$ greater than a value" means that the material has a first loss factor $\eta$ greater than the value for each of the temperatures comprised between −20° C. and 60° C.

A dynamic characterization of a material is carried out on a visco-analyzer of the Metravib visco-analyzer type, under the following measurement conditions. A sinusoidal load is applied to the material. A measurement sample made of the material to be measured consists of two rectangular parallelepipeds, each parallelepiped having a thickness of 3.31 mm, a height of 10.38 mm and a width of 6.44 mm. Each parallelepiped made of the material is also referred to as a shear "test specimen". The excitation is implemented with a dynamic amplitude of 5 µm around the rest position, covering the frequency range comprised between 5 Hz and 700 Hz, and covering a temperature range comprised between −20° C. and +60° C.

The visco-analyzer makes it possible to subject each test specimen (each sample) to deformations under precise temperature and frequency conditions, and to measure the displacements of the test specimen, the forces applied to the test specimen and their phase shift, which makes it possible to measure rheological quantities characterizing the material of the test specimen.

The use of measurements makes it possible especially to calculate the Young's modulus E of the material, and particularly the real part E' of the Young's modulus and the imaginary part E" of the Young's modulus of the material, and thus to calculate the tangent of the loss angle (or loss factor) $\eta$ (also referred to as tan δ).

5

A value of the real part E' of the Young's modulus and/or a loss factor η of a material are measured without the material being pre-stressed.

"Glazing" means a structure comprising at least one sheet of organic or mineral glass, preferentially suitable for being mounted in a vehicle, preferentially a motor vehicle.

The glazing can comprise a single glass sheet or a multilayer glazed assembly at least one sheet of which is a glass sheet.

A glazing can comprise a glazed assembly. The glazed assembly comprises at least one glass sheet. The glass can be organic or mineral glass.

The glass can be tempered. The glazed assembly is preferably laminated glazing. "Laminated glazing" means a glazed assembly comprising at least two glass sheets and an interlayer film made of plastic material, preferentially visco-elastic, separating the two glass sheets. The interlayer film made of plastic material can comprise one or more layers of a visco-elastic polymer such as polyvinyl butyral (PVB) or an ethylene-vinyl acetate copolymer (EVA). The interlayer film is preferably made of standard PVB or of acoustic PVB (such as single-layer or tri-layer acoustic PVB). Acoustic PVB can comprise three layers: two outer layers of standard PVB and an inner layer of PVB with added plasticizer so as to make it less rigid than the outer layers.

"Ellipse" means a closed planar curve obtained by the intersection of a cone of revolution with a plane, provided that it intersects the axis of rotation of the cone or of the cylinder. The ellipse is a conic section of eccentricity strictly comprised between 0 and 1. The ellipse is also the locus of points whose sum of distances to two fixed points, referred to as foci, is constant.

DETAILED DESCRIPTION OF THE INVENTION

General Architecture and Theoretical Elements

Referring to FIG. 2, to FIG. 3, and to FIG. 4, a device 1 for soundproofing a plate 4 comprises a soundproofing part 2 and a mounting part 3.

The mounting part 3 is mounted secured to the soundproofing part 2. Preferably, the mounting part 3 and the soundproofing part 2 form a single monolithic part made of a single first material. The mounting part 3 has a second thickness $h_2$ in contact with the soundproofing part 2. The device 1 extends in a main direction 6. Preferably, the thickness of the mounting part 3 is constant and is equal to the second thickness $h_2$ along the main direction 6.

The mounting part 3 is configured to be mounted secured to a border of the plate 4. The border of the plate can be an edge face of the plate 4. The border of the plate can be perpendicular to the main direction 6, so that the main direction 6 is parallel to a surface along which the plate 4 extends.

The soundproofing part 2 is made of the first material. The soundproofing part 2 extends along a first length l in the first main direction 6. The soundproofing part 2 has a first thickness $h_1$ of the first material, in a direction perpendicular to the first main direction 6. The first thickness $h_1$ varies, based on an X coordinate, along the first length l, proportionally to a value of $x^n$, wherein n is a real number strictly greater than 1, from a minimal thickness $h_{1min}$ until the second thickness $h_2$, the first length l being predetermined so that the minimal thickness $h_{1min}$ is less than or equal to one third of the second thickness $h_2$. The X coordinate is equal to zero when the thickness $h_1$ of the soundproofing part 2 is equal to $h_{1min}$. When the X coordinate is equal to the first length l, the thickness $h_1$ of the soundproofing part 2 is equal to the thickness $h_2$ of the mounting part 3.

Thus, the device 1 makes it possible to receive the bending waves propagating from the border of the plate 4 without reflecting them towards the plate 4. When the plate 4 is exposed to an incident sound wave, the bending waves propagating, once transmitted to the device 1, first into the mounting part 3 and then into the soundproofing part 2. The soundproofing part 2 prevents the reflection of the bending waves in the device 1, which makes it possible to sound-proof the plate 4 when the device 1 is mounted secured to the plate 4.

Indeed, as described in the document Mironov et al. (Mironov, M. A., 1988, *"Propagation of a flexural wave in a plate whose thickness decreases smoothly to zero in a finite interval"*, Soviet Physics Acoustics-USSR, 34(3), 318-319), a reduction of the thickness of a thin plate on its edges can render the edges non-reflective for bending waves in the material of the plate, when the reduction follows a power law, so that the thickness h of the plate is proportional to $x^n$, wherein n is a real number strictly greater than 1.

The first thickness $h_1$ of the soundproofing part 2 can be defined by the following formula (1):

$$h_1(x) = \varepsilon \cdot x^n \qquad (1)$$

wherein ε is a proportionality factor.

The phase velocity $c_{b1}$ of the bending waves in the soundproofing part 2 can be defined based upon the thickness $h_1(x)$ of the soundproofing part by the following formula (2):

$$c_{b1} = \left( \frac{E'_1 h_1(x)^2 \omega^2}{12\rho_1(1-\nu_1^2)} \right)^{\frac{1}{4}} \qquad (2)$$

wherein $E'_1$ is the real part of the Young's modulus of the first material, p, is the density of the first material, $v_1$ is the Poisson's ratio of the first material, $h_1(x)$ is the thickness of the soundproofing part at the X coordinate and w is the angular velocity of the incident sound wave.

From the phase velocity $c_{b1}$ in the soundproofing part 2, it is possible to calculate a transit time of a bending wave propagating in the soundproofing zone 11. When the thickness $h_{1min}$ tends towards zero thickness, the transit time tends towards infinity. Thus, the incident bending wave is not reflected by the soundproofing part 2, which makes it possible to increase the soundproofing of the plate 4.

The term "acoustic black hole" is used to designate the soundproofing part 2. The device 1 comprises at least one acoustic black hole. The device 1 can also comprise a plurality, and preferably a network, of acoustic black holes.

In practice, it is not possible to manufacture a zero thickness $h_{1min}$. The inventors have discovered that the soundproofing effect appears when the first length l is predetermined so that the minimal thickness $h_{1min}$ is less than or equal to one third of the second thickness $h_2$. Especially, the first length l is predetermined so that the minimal thickness $h_{2min}$ is less than or equal to one fifth of the second thickness $h_2$. More preferentially, the first length l is predetermined so that the minimal thickness $h_{1min}$ is less than or equal to one tenth of the second thickness $h_2$.

The inventors have also discovered that the soundproofing effect appears for n strictly greater than 1, especially greater than or equal to 5/3, and preferentially greater than or equal to 2. Moreover, n can be strictly less than 100, so as to prevent a reflection at the junction between the soundproofing part 2 and the mounting part 3. The soundproofing part 2 can have, in a second main direction 16, a size greater than or equal to the first length l, the second main direction 16 being locally perpendicular to the first main direction 6 and perpendicular to a direction in which the thickness of the device 1 extends locally.

Soundproofing Part 2

Referring to FIG. 2 and FIG. 3, the device 1 can comprise a side border 9, the soundproofing part 2 forming a thinning of the device 1 from the mounting part 3 until the side border 9. Preferentially, n is a real number greater than or equal to 2. The soundproofing part 2 thus forms a blade or an edge extending in the second main direction 16. Thus, it is possible to facilitate the manufacture of the device 1, while allowing the soundproofing of a plate 4. Preferably, the soundproofing part 2 extends in the second main direction 16 over a length greater than or equal to the first length l.

Referring to FIG. 4, the soundproofing part 2 can have at least one recess 7. Preferentially, n is a real number greater than or equal to 5/3. Preferably, the recess 7 has a minimum size $W_{min}$, according to the surface in which the plate 4 extends, greater than or equal to the first length l. The recess 7 can have an elliptical shape, and preferentially a circular shape. An ellipse formed by the recess 7 can have a minimum radius $r_{min}$. Preferably, the minimum radius $r_{min}$ of the ellipse is greater than or equal to the first length l. The recess 7 can also have a square or rectangular shape.

Referring to FIG. 4 and FIG. 5, a cut-out 17 can be formed at the center of the recess 7. Thus, a soundproofing part 2 having the minimal thickness $h_{1min}$ can be manufactured so that the minimal thickness $h_{1min}$ is as close as possible to a zero thickness, which makes it possible to minimize the reflection of a bending wave propagating in the device 1 and thus to increase the soundproofing of the plate 4. Preferably, when the recess has an elliptical shape, the first length l is greater than the difference between the radius r or the minimum radius $r_{min}$ of the recess 7 and the radius of the cut-out.

The soundproofing part 2 can have different shapes. The first material can form an edge on the side border 9 of the soundproofing part 2. As a variant, the material can have a fork-shaped section, the soundproofing part 2 forming two edges on the border of the soundproofing part 2. The first thickness $h_1$ can be, in this case, measured by adding the thicknesses of each of the arms of the fork. The material can form a recess 7. The material can also form a cavity. In this case, the first thickness $h_1$ of the soundproofing part 2 is measured by adding the thicknesses of the material forming the cavity. The soundproofing part 2 can also extend across a curved surface. In this case, the measurement of the first thickness $h_1$ of the soundproofing part 2 is carried out by measuring the thickness of the material in a direction locally perpendicular to the curved surface.

VISCO-Elastic Dissipator 8

Referring to FIG. 2, to FIG. 3 and to FIG. 4, the device 1 can comprise a visco-elastic dissipator 8. The dissipator 8 can be mounted secured in contact with at least one part of the soundproofing zone 11. The dissipator 8 can be made of a material having a first loss factor $\eta_1$ strictly greater than 0.05, especially strictly greater than 0.10, and preferentially strictly greater than 0.15. Thus, the energy concentrated in a soundproofing zone 11 by incident bending waves is dissipated in a viscous manner, which makes it possible to reduce the reflection of a bending wave in the device 1 and thus to avoid the emission of bending waves in the plate 4 by reflection in the device 1. The material of the dissipator 8 is visco-elastic, and can have a real part E' of the Young's modulus less than 100 MPa, and preferentially less than 10 MPa.

Referring to FIG. 2, FIG. 3 and FIG. 4, the dissipator 8 can be mounted secured to a part of the soundproofing zone 11 having a thickness comprised between $h_{1min}$ and $h_2/2$. Thus, the bending waves are dissipated by the dissipator 8 at the location where they are most concentrated. Preferably, a part of the dissipator 8 is in contact with the soundproofing part 2 having the minimal thickness $h_{1min}$.

The dissipator 8 can be made of a material selected from a silicone, a nitrile and a polyurethane. The visco-elastic properties of the known materials can be measured by the methods described herein. The material of the dissipator can have a glass transition temperature comprised between −80° C. and −50° C., inclusive. For example, the material of the dissipator can comprise a methyl vinyl silicone rubber (MVQ) crosslinked by a benzoyl peroxide. The material of the dissipator can also be a porous material. The loss factor of the material can also be adjusted by a tackifying agent, for example a glycerin ester, calcium carbonate or carbon nanotubes. For example, the polyurethane sealant Weberseal PU 40 (registered trademark) of the Weber brand has a loss factor $\eta$ equal to 0.41 and a value of the imaginary part E' of the Young's modulus equal to 7.2 MPa. For example, the polyurethane sealant Sikaflex PRO-11 FC (registered trademark) of the Sika brand has a loss factor $\eta$ equal to 0.20 and a value of the imaginary part E' of the Young's modulus equal to 1.2 MPa.

Mounting Part 3

Referring to FIG. 6 and to FIG. 7, the mounting part 3 is configured to be mounted secured to a border 11 of the plate 4. The mounting part 3 comprises a termination able to be mounted secured to the border 11.

The mounting part 3 can form a housing 10 able to receive the border 11 of the plate 4. The housing 10 can form a clamp configured to surround the border 11. Thus, the housing 10 can be in contact with an edge face of the plate 4 and at the same time with an upper face and a lower face of the plate 4. Thus, the device 1 can be mounted secured to the plate 4 without having a degree of rotational and translational freedom with respect to the plate 4. This configuration makes it possible to effectively transmit the bending waves from the plate 4 to the device 1. A termination of the mounting part 3 can also be bonded to the border 11. The mounting part 3 can also be configured to be mounted releasably secured to the plate 4.

Assembly 13

One assembly 13 comprises a device 1 and a plate 4 having a border 11, wherein the mounting part 3 is mounted secured to the border 11 of the plate 4. The plate 4 has a third thickness $h_3$ at the border 11. The third thickness $h_3$ is preferably constant in the plate 4.

One aspect of the invention is a method for manufacturing the assembly 13. The method comprises a step of securing the mounting part 3 to a border of the plate 4. Preferably, the mounting part 3 can be embedded, snap-fit or releasably mounted on the border of the plate 4. The mounting part 3 can also be bonded to the border of the plate 4. The adhesive can be selected from at least one single- or multi-component structural glue, of the epoxy, methacrylate, polyurethane, acrylic, vinyl type.

Preferably, the difference between a first phase velocity $c_{b1}$ of the bending waves in the mounting part 3 and between a second phase velocity $c_{b2}$ of the bending waves in the plate

4 is less than 20% of the second phase velocity $c_{b2}$, and preferentially is less than 10% of the second phase velocity $c_{b2}$ during the exposure of the plate 4 to a sound wave with a determined angular velocity $\omega$.

The first phase velocity $c_{b1}$ of the bending waves in the mounting part 3 is defined by the following formula (3):

$$c_{b1} = \gamma_1 \cdot \omega^{\frac{1}{2}} \quad (3)$$

wherein $\omega$ is an angular velocity of the sound wave incident on the plate 4, and $\gamma_1$ is a first component of phase velocity defined by the following formula (4):

$$\gamma_1 = \left( \frac{E'_1 h_2{}^2}{12\rho_1(1 - \nu_1{}^2)} \right)^{\frac{1}{4}} \quad (4)$$

wherein $E'_1$ is the real part of the first Young's modulus of the first material, $\rho_1$ is a first density of the first material, and $\nu_1$ a first Poisson's ratio of the first material.

The second phase velocity $c_{b2}$ of the bending waves in the plate 4 is defined by the following formula (5):

$$c_{b2} = \gamma_2 \cdot \omega^{\frac{1}{2}} \quad (5)$$

wherein $\omega$ is an angular velocity of the sound wave incident on the plate 4, and $\gamma_2$ is a first component of phase velocity defined by the following formula (4):

$$\gamma_2 = \left( \frac{E'_2 h_3{}^2}{12\rho_2(1 - \nu_2{}^2)} \right)^{\frac{1}{4}} \quad (6)$$

wherein $E'_2$ is the real part of the second Young's modulus of the material of the plate 4, $\rho_2$ is a second density of the material of the plate 4, and $\nu_2$ is a second Poisson's ratio of the material of the plate 4.

The relationship described previously between the phase velocities of the bending waves can thus be expressed as follows: the difference between the first component $\gamma_1$ and between the second component $\gamma_2$ is less than 20% of the component $\gamma_2$, and preferentially is less than 10% of the second component $\gamma_2$. Thus, the reflection of a bending wave propagating from the plate 4 towards the device 1 can be limited or cancelled out.

Preferably, the plate 4 is a glazing 12. The machining of a glazing 12 is a complex and expensive operation. In particular, the machining of an acoustic black hole can be complex, especially due to the profile of the soundproofing part 2 of the acoustic black hole. Thus, it is possible to improve the soundproofing of the glazing 12, by mounting it secured on a device 1, without having to machine the glazing 12. Preferably, the glazing 12 comprises at least one mineral glass sheet. Indeed, a mineral glass sheet may be required in many types of glazings 12, even though it is difficult to machine. The glazing 12 may be a laminated or monolithic glazing.

When the glazing 12 comprises a mineral glass sheet, the first material can be aluminum, and the second thickness $h_2$ is equal to the third thickness $h_3$. Indeed the real part of the Young's modulus $E'_1$, the Poisson's ratio $\nu_1$ and the density $\rho_1$ of aluminum make it possible, with respect to the real part of the Young's modulus $E'_2$, the Poisson's ratio $\nu_2$ and the density $\rho_2$ of mineral glass, to verify the relationship between the first component $\gamma_1$ and the second component $\gamma_2$ for a second thickness $h_2$ equal to a third thickness $h_3$. Thus, it is possible to manufacture a device 1 in aluminum and thus to facilitate the machining of the one or more acoustic black holes, while limiting the increase in the mass of the assembly 13.

When the glazing 12 comprises a mineral glass sheet, the first material can be a polymer material, preferentially resin, and the second thickness $h_2$ is strictly greater than the third thickness $h_3$. Indeed the real part of the Young's modulus $E'_1$, the Poisson's ratio $\nu_1$ and the density $\rho_1$ of polymer materials make it possible, with respect to the real part of the Young's modulus $E'_2$, to the Poisson's ratio $\nu_2$ and to the density $\rho_2$ of mineral glass, to verify the relationship between the first component $\gamma_1$ and the second component $\gamma_2$ for a second thickness $h_2$ strictly greater than a third thickness $h_3$. Thus, it is possible to manufacture a device 1 made of a first polymer material and thus to facilitate the machining of the one or more acoustic black holes, while limiting the increase in the mass of the assembly 13.

The plate 4 can also be selected from a ceiling and a partition, preferably a gypsum partition. Thus, it is possible to improve the soundproofing of a ceiling or a partition without modifying them.

Referring to FIG. 8 and to FIG. 9, the glazing 12 can be a side glazing 12 of a motor vehicle. Preferably, the assembly 13 comprises means for securing to a door of the motor vehicle, so that the device 1 is arranged in the door outside of the belt portion when the assembly 13 is secured to the door. In this case, the device 1 is configured to be arranged under a licking seal of the door. Referring to FIG. 8, the soundproofing part 2 can form a thinning of the device 1 from the mounting part 3 until the side border 9.

Referring to FIG. 9, the soundproofing part 2 can comprise a network of recesses 7 in the first material.

FIG. 10 illustrates an average acceleration of a glazing 12 in a direction according to the thickness of the glazing 12, based upon the frequency of a sound wave incident on the glazing 12. The glazing 12 is made of mineral glass. The glazing 12 has a thickness $h_3$ equal to 4 mm, a length along the main direction 6 equal to 300 mm and a width equal to 60 mm. The curve (a) illustrates an average acceleration of the glazing 12 in the absence of device 1. The curve (b) illustrates an average acceleration of the glazing 12, the glazing 12 being mounted secured to a device 1 according to one embodiment of the invention, made of resin, in the absence of dissipator 8. The curve (c) illustrates an average acceleration of the glazing 12, the glazing 12 being mounted secured to a device 1 according to one embodiment of the invention, made of resin, comprising a dissipator 8.

FIG. 11 illustrates a numerical simulation by the finite element method of a soundproofing of a glazing 12, based upon the frequency of an incident sound wave. The curve (d) illustrates a soundproofing of a laminated glazing 12, comprising a deadening layer having a loss factor equal to 1%, in the absence of device 1. The curve (e) illustrates a soundproofing of a laminated glazing 12, comprising a deadening layer having a loss factor equal to 15%, in the absence of device 1. The curve (f) illustrates a soundproofing of a laminated glazing 12, comprising a deadening layer having a loss factor equal to 1%, the glazing 12 being mounted secured to a device 1 made of aluminum. The curve (g) illustrates a soundproofing of a laminated glazing 12, comprising a deadening layer having a loss factor equal to 1%, the glazing 12 being mounted secured to a device 1 made of resin.

The invention claimed is:

1. A device for soundproofing a plate, comprising:
a soundproofing part, and
a mounting part, wherein
the mounting part is configured to be mounted secured to a border of the plate, the mounting part being mounted secured to the soundproofing part and having a second thickness $h_2$ in contact with the soundproofing part,
the soundproofing part is made of a first material, and extends along a first length l in a first main direction,
the soundproofing part having a first thickness $h_1$ of the first material in a direction perpendicular to the first main direction,
the first thickness $h_1$ varying, based on an x coordinate, along the first length I, proportionally to a value of $x^n$, wherein n is a real number strictly greater than 1, from a minimal thickness $h_{1min}$ until the second thickness $h_2$, the first length l being predetermined so that the minimal thickness $h_{1min}$ is less than or equal to one third of the second thickness $h_2$.

2. The device according to claim 1, comprising a side border, wherein the soundproofing part forms a thinning of the device from the mounting part until the side border.

3. The device according to claim 1, wherein the soundproofing part has at least one recess in the first material.

4. The device according to claim 1, comprising a visco-elastic dissipator, wherein the visco-elastic dissipator is mounted secured in contact with at least one part of the soundproofing part, the visco-elastic dissipator being made of a material having a first loss factor $\eta_1$ strictly greater than 0.05.

5. The device according to claim 1, wherein the mounting part forms a housing able to receive a border of the plate.

6. An assembly comprising a device according to claim 1, and a plate having a border, wherein the mounting part is mounted secured to the border of the plate such that the soundproofing part is positioned opposite the plate and extends away from the mounting part in the first main direction.

7. The assembly according to claim 6, wherein the first material has a real part of the first Young's modulus $E'_1$, a first density $\rho_1$, and a first Poisson's ratio $v_1$, and wherein the mounting part has a first component $\gamma_1$ of phase velocity of a bending wave defined by $$\gamma_1 = \left( \frac{E'_1 h_2^2}{12\rho_1(1 - v_1^2)} \right)^{\frac{1}{4}}$$

and wherein the plate has a third thickness $h_3$, a real part of the second Young's modulus $E'_2$, a second density $\rho_2$ and a second Poisson's ratio $v_2$, defining a second component $\gamma_2$ of phase velocity of a bending wave defined by $$\gamma_2 = \left( \frac{E'_2 h_3^2}{12\rho_2(1 - v_2^2)} \right)^{\frac{1}{4}}$$

and wherein a difference between the first component $\gamma_1$ and between the second component $\gamma_2$ is less than 20% of the second component $\gamma_2$.

8. The assembly according to claim 6, wherein the plate is a glazing.

9. The assembly according to claim 8, wherein the glazing comprises at least one mineral glass sheet.

10. The assembly according to claim 9, wherein the glazing is a laminated glazing.

11. The assembly according to claim 7, wherein the plate is a glazing comprising a mineral glass sheet, and wherein the first material of the device comprises aluminum, the second thickness $h_2$ being equal to the third thickness $h_3$.

12. The assembly according to claim 7, wherein the plate is a glazing comprising a mineral glass sheet, and wherein the first material of the device comprises a polymer material, the second thickness $h_2$ being strictly greater than the third thickness $h_3$.

13. A method for manufacturing an assembly comprising a device according to claim 1, and a plate having a border, the method comprising securing the mounting part to a border of the plate such that the soundproofing part is positioned opposite the plate and extends away from the mounting part in the first main direction.

14. The device according to claim 2, wherein n is a real number greater than or equal to 2.

15. The device according to claim 3, wherein n is a real number greater than or equal to 5/3.

16. The device according to claim 3, wherein a cut-out is formed at a center of the recess.

17. The device according to claim 4, wherein the first loss factor $\eta_1$ is strictly greater than 0.10.

18. The device according to claim 17, wherein the first loss factor $\eta_1$ is strictly greater than 0.15.

19. The assembly according to claim 7, wherein the difference between the first component $\gamma_1$ and between the second component $\gamma_2$ is less than 10% of the second component $\gamma_2$.

20. A device for soundproofing a plate, comprising:
a soundproofing part, and
a mounting part, wherein
the mounting part is configured to be mounted secured to a border of the plate, the mounting part being mounted secured to the soundproofing part such that, when the mounting part is mounted secured to the border of the plate, the soundproofing part is positioned opposite the plate and extends away from the mounting part in a first main direction, the mounting part having a second thickness $h_2$ in a direction perpendicular to the first main direction in contact with the soundproofing part,
the soundproofing part is made of a first material, and has a first length l in the first main direction,
the soundproofing part having a first thickness $h_1$ of the first material in the direction perpendicular to the first main direction,
the first thickness $h_1$ varying, based on an x coordinate in the first main direction, along the first length l, proportionally to a value of $x^n$, wherein n is a real number strictly greater than 1, from a minimal thickness $h_{1min}$ at the x coordinate of zero until the second thickness $h_2$ at the x coordinate of l of the first length, the first length l being predetermined so that the minimal thickness $h_{1min}$ is less than or equal to one third of the second thickness $h_2$.

\* \* \* \* \*